INVENTOR
JOHN HRUSTICH

BY
ATTORNEY

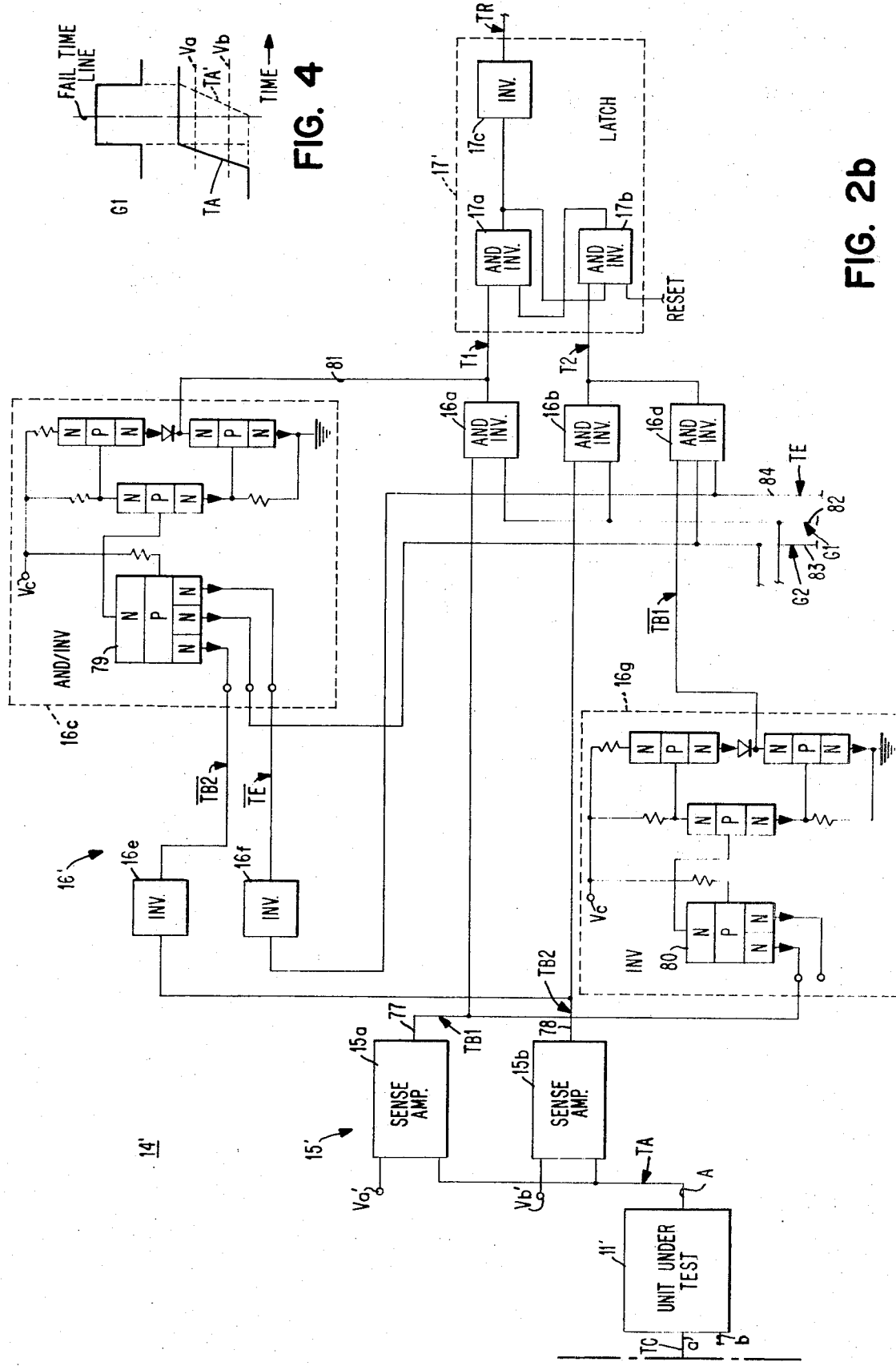

United States Patent Office 3,541,441
Patented Nov. 17, 1970

3,541,441
TEST SYSTEM FOR EVALUATING AMPLITUDE AND RESPONSE CHARACTERISTICS OF LOGIC CIRCUITS
John Hrustich, Endicott, N.Y., assignor to International Business Machines Corporation, Armonk, N.Y., a corporation of New York
Filed Feb. 17, 1969, Ser. No. 799,841
Int. Cl. G01r 31/00
U.S. Cl. 324—73
16 Claims

ABSTRACT OF THE DISCLOSURE

The tester tests for predetermined and selectable amplitude and response characteristics of the output signal of a circuit in response to a given set of input conditions. In each test cycle, the tester senses the actual level of the output signal of the circuit under test in a first time period which is related to the nominal response time of the circuit under test. If the signal is either above or below two first and second reference levels, respectively, the tester provides a binary test result signal, each of the binary levels of which is indicative of the actual level of the signal under test with respect to a mutually exclusive one of the reference levels. If the signal is at a level between the two reference levels, the test result signal remains at its previous binary level. In another time period, which is associated with the duty period of the output signal of the circuit under test, the tester senses the actual level of the output signal under test with respect to the first and second reference levels and provides a binary test result signal, one level of which indicates that the output signal is and remains at a level which is expected for the given input conditions. If the level of the output signal is not at the expected level or does not remain at the expected level, the resultant test result signal is in its other binary level which indicates that the output signal under test is not at the expected level. If the output signal of the circuit under test is at and remains at the expected level during the second period, the resultant test signal obtained during the second period is correlated with the test result signal obtained during the first period to determine whether it has responded to the given input conditions within the nominal response time. A universal driver circuit provides variable adjustable driving signal characteristics for standard input signals.

BACKGROUND OF THE INVENTION

This invention relates to test circuit apparatus for testing a signal for predetermined amplitude and response time characteristics and more particularly for testing the output signal of logic and/or other type circuits.

Heretofore in the prior art there have been circuit testers which test the output of a logic circuit to determine if the logic circuit output signal was in its appropriate binary state. In a known logic circuit tester of the prior art, respective individual logic circuits were provided for testing each of four possible conditions of the output signal. This particular prior art tester required four types of level detectors. One detector is an insufficient positive level detector which checked for a logic 1; a second is an excessive positive level detector which checked for an excessive logic 1; the third type is an insufficient negative level detector which checks for a logic 0; and the fourth is an excessive negative level detector which checks for an excessive logic 0. This prior art tester was generally found to be satisfactory but had a high level hardware component requirement due to the aforementioned four individual level detector circuits required for its operation. Furthermore, in systems for testing multi-outputs, the hardware requirements and hence complexity was further compounded.

Heretofore in the test systems of the prior art, the driver circuits for conditioning the logic or other type circuits under test were not readily adaptable for testing different circuits having different driver input signal requirements.

SUMMARY OF THE INVENTION

It is an object of this invention to provide test circuit apparatus for testing predetermined and/or preselectable amplitude and response characteristics of a logic and/or other type circuit output signal.

Another object of this invention is to provide test circuit apparatus for testing the output of a logic and/or other type circuit which provides test result signals which indicate that the output signal being tested is in and remains in an expected level or condition for a given set of input conditions, and provides a test result signal which indicates that the output signal being tested is not in the expected level or condition, and if the output signal being tested is in the expected level or condition provides a test result signal which is indicative of whether or not the signal attained the expected level or condition by a given time period after the given set of input conditions have been applied to the input of the circuit being tested.

Still another object of this invention is to provide test circuit apparatus for testing the output of a logic circuit which is relatively simple and/or mitigates the hardware requirements thereof.

Still another object of this invention is to provide a circuit test system which is operable by a process control general purpose computer.

Still another object of this invention is to provide a universal driver circuit for providing variable adjustable driver signals in response to standard input signals.

Still another object of this invention is to provide a driver circuit of the aforementioned kind which is operated by a digital computer.

According to one aspect of the invention, there is provided a test circuit apparatus for testing an output signal of a given circuit for predetermined amplitude and response time characteristics in response to a predetermined set of input conditions to the given circuit. The apparatus includes a bi-level sense amplifier that senses the signal being tested. The sense amplifier in response to the signal level being sensed provides first and second binary sense output signals at two mutually exclusive outputs. The first sense output signal is in a predetermined one of its two binary levels whenever the signal under test is above a predetermined first reference level and is in the other of its two binary levels whenever the signal is not above the first reference level. The second sense output signal is in a predetermined one of its two binary levels whenever the signal being tested is below a predetermined second reference level and in its other binary level whenever the signal is not below the second reference level. The aforementioned predetermined ones of the respective binary levels of the first and second sense output signals are complementary with respect to each other whenever the output signal under test has a level that is either above or below the first and second reference levels, respectively. The first and second binary sense output signals are in the same preselected ones of their respective binary levels whenever the output signal of the given circuit is in a level which is substantially inclusive between the first and second reference levels. In addition, a logic circuit is provided which has first and second inputs conditioned by the first and second binary sense output signals, respectively, and a third input conditioned by a binary third signal. The first and second binary levels of the third signal are indicative of the expected amplitude characteristic of the output signal being tested for the given set of input conditions with respect to the first and second reference levels, respectively. The logic gate circuit further has first and second gate control inputs and an output. The logic circuit provides a binary first test result signal at its output during a first time period in response exclusively to the first and second binary sense output signals and a first control signal applied to its first and second inputs and the first control input, respectively. The first and second binary levels of the first test result signal are indicative of the actual level of the output signal being tested whenever the actual level is above and below the respective first and second reference levels, respectively. The first test result signal remains in its previous output level whenever the actual level of the output signal being tested is inclusively between the first and second reference levels. The predetermined first time period is related to the aforesaid predetermined response time characteristic. The logic circuit further provides a binary second test result signal at its output during a second time period in response exclusively to the first and second binary sense output signals, and third signal, and the second control signal applied to its first, second, and third inputs and its second control input, respectively. The second test result signal is in a binary level corresponding to the expected amplitude characteristic and in an opposite binary level corresponding to the expected amplitude characteristic whenever the output signal of the given circuit has and maintains the aforesaid expected amplitude characteristic during the second period and whenever the output signal of the given circuit does not have or maintain the aforesaid expected amplitude characteristic during the second time period, respectively. The second period is substantially coincident with a predetermined part of the duty period of the output signal of the given circuit.

According to another aspect of the invention the test circuit apparatus is further provided with correlation means for correlating the first and second test result signals. The correlating means indicates at least that the output signal of the given circuit has and maintains the aforementioned expected amplitude characteristic during the second period and that the output signal of the given circuit responds to the given set of input conditions in the response time associated with the aforementioned predetermined response time characteristic whenever the output signal has both of these characteristics. In accordance with another aspect of the invention the correlation indicates that the output signal of the given circuit does or does not have or maintain the aforementioned expected amplitude characteristic whenever the output signal does or does not have or maintain, respectively, the amplitude characteristic during the second time period, and further indicates that the output signal of the given circuit does or does not respond to the set of input conditions in the response time associated with the predetermined response time characteristic whenever the output signal does have and maintains the predetermined amplitude characteristic during the second time period but does not respond to the given input conditions in the aforementioned response time.

In accordance with another aspect of the invention driver circuit apparatus is provided which produces a binary output signal having variable selectable predetermined signal amplitude characteristics in response to a binary input signal having predetermined fixed signal amplitude characteristics. The driver circuit apparatus includes a logic circuit which in response to a gating signal and the binary levels of the input signal generates at two respective outputs first and second output signals, respectively, which are indicative of the binary 1 and binary 0 states or levels, repectively, of the input signal. The outputs of the logic circuit are coupled by respective isolation transformers to the inputs of a latch circuit means. In response to the first and second output signals of the logic circuit, the latch circuit means conditions its binary output signal to compatible binary states of the input signal. The driver circuit apparatus includes an output driver circuit or stage which has a first transistor and a pair of second and third transistors arranged in complementary symmetry. The first transistor is controlled by the output levels of the latch circuit means output signal and the output of this transistor is coupled to the input electrodes of the second and third transistors. Adjustable first and second upper and lower clamping circuits are provided in the driver circuit and are adjusted to the preselected upper and lower levels, respectively, desired for the driver circuit apparatus output signal. The first transistor and the latch circuit means are selectively referenced by a switching means either to a ground reference level or a unipolar voltage reference level. The second and third transistors are referenced to ground through the load impedance. With the switching means in the ground reference level position the output signal of the driver circuit apparatus are unipolar signals of a given polarity type. However, with the switching means in the unipolar reference level, the output signal of the driver circuit apparatus depending on the adjustment of the diode clamping circuits may be of opposite polarity type or may be of a bi-polar type.

The foregoing and other objects, features, and advantages of the invention will be apparent from the following more particular description of the preferred embodiments of the invention, as illustrated in the accompanying drawing.

BRIEF DESCRIPTION OF THE DRAWING

FIG. 2b is a schematic diagram, partially shown in block form, of a preferred embodiment of a single output channel of the circuit tester of FIG. 1; and FIGS. 3 and 4 are respective waveform diagrams of certain signals of the circuits of FIGS. 1, 2a–2b.

In the figures, like elements are designated with similar reference numerals.

DESCRIPTION OF THE PREFERRED EMBODIMENTS

Figure 1:
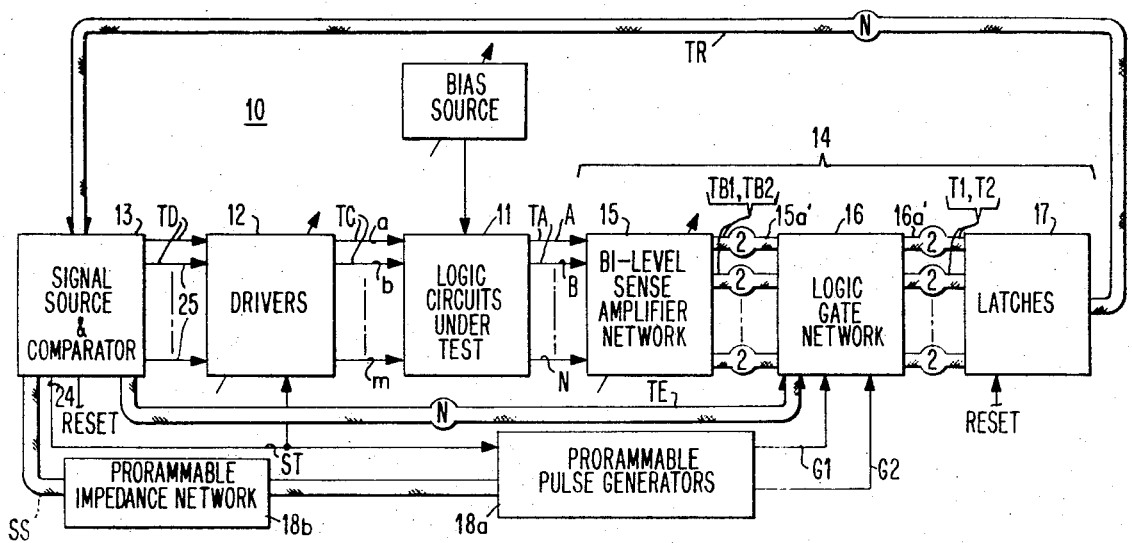
FIG. 1 is a schematic view in block form of a preferred embodiment of the circuit tester of the present invention.

Referring to FIG. 1, the preferred embodiment of the circuit tester of the present invention is illustrated therein as a system for testing logic circuits and is generally referred to by the reference numeral 10. The system 10 provides conditioning signals TC to the inputs a–m of the logic circuits 11 to be tested. From the resultant binary signals TA at the outputs A–N of circuits 11, the system 10 produces test result signals TR from which may be determined which circuits 11 under test are good and which are bad.

It should be understood that the inputs a–m are arranged in predetermined groups of one or more inputs each and that each group of inputs has a group of one or more outputs associated with it. For example, in a simple case, one or more of the logic circuits 11 may be single-input/single-output inverter circuit or circuits. In another case, by way of example, one or more of the logic circuits 11 may be multiple-input/single-output AND gate or gates. Still in another case, for example, one or more of the logic circuits may be a latch device or devices and each such latch may have two inputs and two outputs corresponding to the particular latch's set and reset inputs and its 1 and 0 outputs, respectively. Moreover, in more complex cases the logic circuits 11 may be of different configurations and functions and/or interconnected in one or more different arrangements, each arrangement having its associated group of inputs and group of outputs.

Briefly, for each input a–m of the circuits 11 to be tested there is connected the output of one of the driver circuits or stages 12 of system 10. The driver circuits 12 provide variably adjustable bi-level output signals TC, which are the input test conditioning signals for the inputs a–m of logic circuits 11. In operation, the output levels of signals TC are adjusted to be compatible to preselected specific input levels for which the particular logic circuits under test are designed to operate.

During each test cycle, the input or inputs of each logic circuit under test are conditioned by the appropriate levels of the signals TC for a given set of input conditions. As a result, in response to the given set of input conditions, each output of the logic circuit if it is operating correctly will be in a known one of either of its two binary states. Depending on the particular sets of input conditions in a multiple output logic circuit, for example, this means that in some cases some outputs are in 1 states and that others are in 0 states, or in other cases all outputs are in 0 states, or in still some other cases all outputs are in 1 states. A signal TA which is above a predetermined first level, e.g. $Va$, represents one of the binary states of the particular logic circuit output, e.g. a 1 state. A signal TA which is below a predetermined second level, e.g. $Vb$, represents the other binary state of the particular logic circuit output, e.g. a 0 state. If a signal TA is not at the correct level for the given input conditions, that is to say the signal TA has an erroneous level for the given input conditions, then the particular logic circuit output and consequently the corresponding logic circuit with which it is associated has failed.

The two levels of each driver circuit output signal TC are in turn selectably determined by the mutually exclusive levels of a standard, i.e. fixed, bi-level control signal TD which is fed to the input of the particular driver circuit. The control signals TD are generated by a multioutput signal source 13, which preferably includes a process control general purpose computer for this purpose and is shown in block form for sake of clarity. As such, each signal TD is either a 1 or 0 data bit as determined by the test program for which the computer is programmed. As is obvious to those skilled in the art, the data bits may be all 1's, or all 0's, or preselected combinations of both. In operation, for each test cycle associated with the test of a particular logic circuit, the appropriate signals TD provide a given set of input conditions to the logic circuit's input or inputs as the case might be. Each logic circuit under test may be tested during two or more successive test cycles by the same or different set of input conditions. Furthermore, in the preferred embodiment, the general purpose computer of source 13 may be programmed to provide, for example, appropriate signals TD so that a particular output of the logic circuit is alternately tested for its binary 1 and binary 0 states during two or more successive test cycles, or alternatively for a particular one of its binary states during two or more successive test cycles. Also, as is obvious to those skilled in the art, in the preferred embodiment the general purpose computer may be programmed for a diagnostic test to provide a new set or sets of input conditions and/or to repeat certain set or sets of input conditions during succeeding test cycles when a certain set or sets of output conditions, e.g. failure of one or more outputs, is determined during a previous test cycle or cycles associated with a given set or sets of input conditions. The signal source 13 also generates other signals SS, ST and TE hereinafter discussed.

The multi-channel output circuit apparatus generally indicated by the reference numeral 14 of system 10 is conditioned by the actual levels of the signals TA at outputs A–N of the logic circuits 11 under test and provides the aforementioned individual output signals TR. For this purpose, each of the identical channels of circuit apparatus 14 is connected to an exclusive one of the outputs A–N. In the preferred embodiment, the output channels of apparatus 14 are operated in a parallel operational mode.

Two correlated tests are made during each test cycle at each output A–N. From the results of one test, which is an amplitude and time response characteristics test, it is determined whether the particular output signal TA has switched or is in an actual binary state by a certain period after the associated inputs have been gated with a given set of input conditions. From the results of the other test, which is an amplitude characteristic test, it is determined if during a predetermined part of the duty period of the particular signal TA whether the signal TA is in and remains in an expected binary state for the given set of input conditions throughout the entire part of the duty period. By correlating the test results, if the particular signal fails the amplitude characteristic duration test, the associated logic circuit and its output is considered a failure and there is no need to examine the results of the amplitude/time response characteristics test. However, if the signal TA passes the amplitude characteristic duration test, then the results of that test when correlated with the results of the other test will indicate whether or not it also passed the amplitude/time response characteristics test. To be considered a good output, the signal TA must pass both tests. The correlation of the test result signals TR may be done by additional logic circuitry, not shown, but in the preferred embodiment is done by the general purpose computer of source 13.

More particularly, the actual level of each of the output signals TA appearing at the respective logic circuit output A–N is sensed by one stage of the multi-stage bi-level sense amplifier network 15. One bi-level sense amplifier circuit or stage of network 15 is contained in each output channel of apparatus 14. The bi-level sense amplifier circuits of network 15 are identical and each has a pair of outputs, e.g. double conductor cable $15a'$. The individual outputs of a last-mentioned pair are sometimes hereinafter referred to as the first sense output and second sense output, respectively.

Each sense amplifier stage generates binary output signals TB1 and TB2 on its aforementioned first and second sense outputs, respectively, in response to the signal TA applied to its input. If the output level of a signal TA from a logic circuit under test is above a variably adjustable predetermined first reference level $Va'$, the resultant binary signals TB1, TB2 are complementary, and in the preferred embodiment at the first sense output the signal TB1 is in its UP level and at the second sense output the signal TB2 is in its DOWN level. If, on the other hand, the output signal level of the logic circuit under test is below a variably adjustable predetermined second reference level $Vb'$ the output signals TB1, TB2 are again complementary, but have respective binary levels opposite to those stated in the aforementioned case where the level of signal TA is above the level $Va'$. Thus, in the preferred embodiment, the signal TB1 at the first sense output is in its DOWN level and the signal TB2 at the second sense output is in its UP level when the level of the signal TA is below the second level $Vb'$. If the actual output signal level of the logic circuit under test is between the aforementioned first and second reference levels $Va'$ and $Vb'$ the sense amplifier stage generates the signals TB1, TB2 with identical binary levels on its respective first and second sense outputs. In the preferred embodiment, for example, in the last-mentioned case the levels of the output signals TB1, TB2 at the first and second sense outputs, respectively, are both in their respective DOWN levels. The reference signal levels $Va'$ and $Vb'$ are adjusted to be compatible to mutually exclusive different ones of the desired two binary levels associated with the two binary states for which the particular output of the logic circuit under test is designed, i.e. binary levels above and below, respectively, the aforementioned predetermined first and second levels $Va$ and $Vb$.

Each pair of signals TB1, TB2 conditions two of the inputs of a mutually exclusive stage of the multi-stage logic gate network 16. The stages of network 16 are identical to one another, and there is one logic gate stage per output channel of apparatus 14. In the preferred embodiment, each of the logic gate stages is also conditioned by a particular one of the bi-level signals TE and is actuated by the application of gate control pulse signals G1, G2.

Each logic gate stage of network 16 generates two bi-level output signals T1, T2. Each of the logic gate stages of network 16 has a pair of outputs, e.g. double conductor cable 16a'. Each output of the pair of logic gate stage outputs is associated with a mutually exclusive different one of the signals T1, T2 and the outputs of a pair are coupled to mutually different ones of the set and reset inputs of one of the latch circuits 17, there being one latch circuit per output channel of apparatus 14. Each of the latch circuits 17 provides a b-level output signal TR.

Signals G1, G2 are generated by pulse generator means generally indicated by the reference numeral 18 which may be considered part of a signal source means which includes the signal source 13. In the two known programmable pulse generators, which are indicated as a single block 18a for sake of clarity, and a selective impedance network 18b for adjusting the pulse characteristics of signals G1, G2 such as their respective pulse widths, amplitudes, risetimes and falltimes, and delay periods. The network 18b includes an arrangement of a series of impedances and relay switches, some of which series are associated with one of the two generators 18a and the others of which are associated with the other generator. Each series of impedances controls a mutually exclusive one of the aforementioned signal characteristics of the particular generator with which it is associated. Each of the relay switches is under the control of one of the switch select signals SS generated by the general purpose computer of signal source 13. When the relay is actuated some of the impedance of a particular one of the series of network 18b is coupled into, or decoupled from as the case may be, the circuit of the particular generator with which the particular series is associated and thereby changes a preselected one of the pulse generator's aforementioned signal characteristics to a preselected value.

The operation of the system 10 will be described in greater detail hereinafter under the heading entitled "Output Channel," the latter being preceded next by a detailed description under the heading entitled "Driver Stage" of a preferred driver circuit apparatus embodiment which is particularly useful and preferred for implementing the driver stages 12 of system 10.

DRIVER STAGE

Figure 2A:
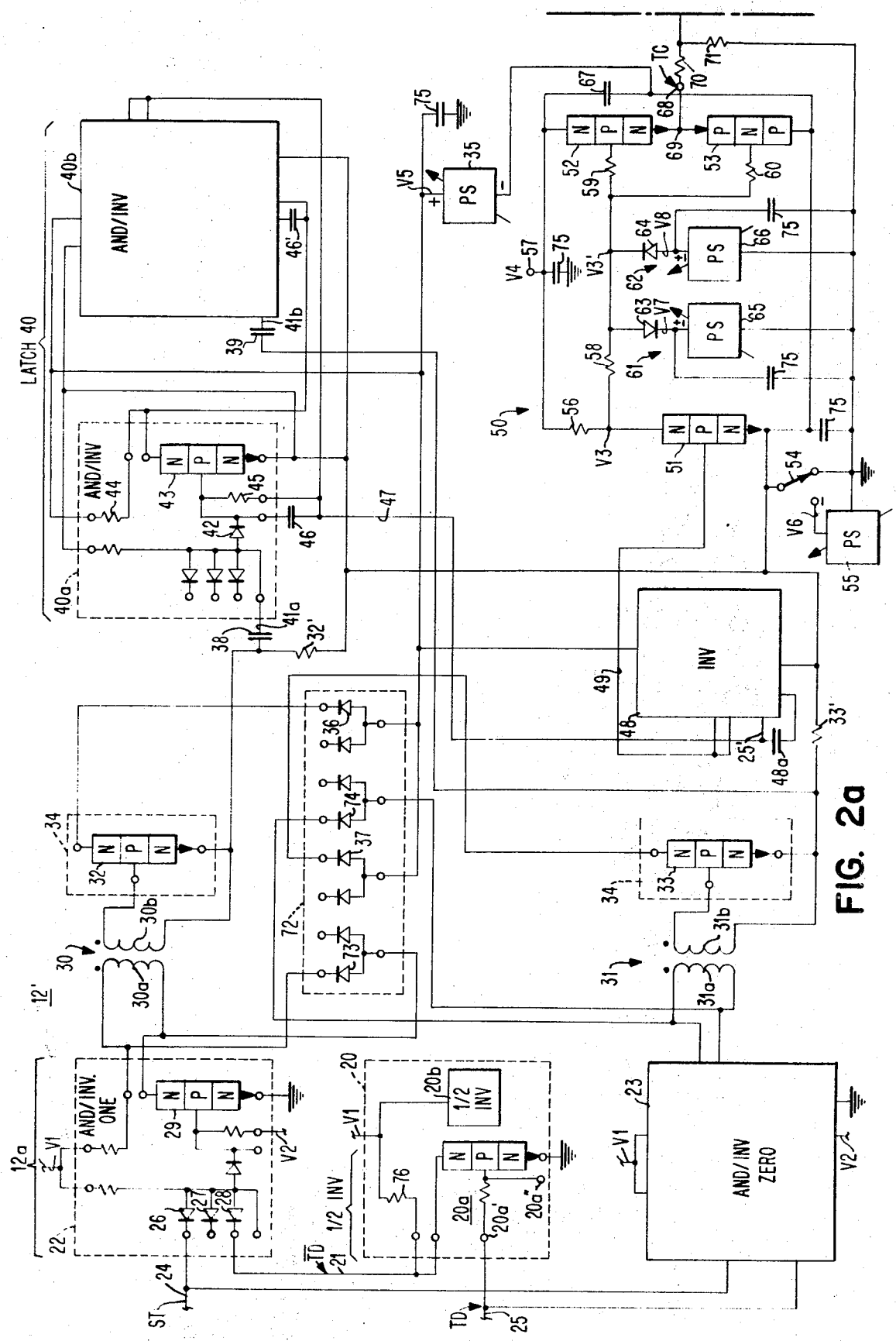
FIG. 2a is a schematic diagram, partially shown in block form, of a preferred embodiment of a single driver stage of the circuit tester of FIG. 1.

Referring now to FIG. 2a, there is shown a single driver stage 12' of the identical driver stages 12 of FIG. 1. Stage 12' has an input logic circuit 12a which includes an inverter, e.g. inverter 20a, which may for example be one-half of a known twin inverter integrated circuit module 20. It should be understood that the other inverter 20b is not part of the stage 12'. The output 21 of inverter 20a is connected to one of the inputs of a known combination AND and INVERTER integrated circuit module 22 of circuit 12a. Modules having similar combinations are designated by the legend AND/INV in the drawing. Another AND/INV integrated circuit module 23 of circuit 12a is provided and is identical to the module 22. Each AND/INV circuit 22, 23 has one of its triple inputs connected to the gate control signal input 24 which in turn is connected to the output of the signal source 13 of FIG. 1 from which is provided the start or synchronization signals ST. Each of the conditioning signals TD for the driver stage 12' provided by the signal source 13 is fed to the conditioning signal input 25 of stage 12' which, in turn, is connected to the input of inverter 20a and a different input of the AND/INV circuit module 23. Thus, during each test cycle the circuits 22, 23 are oppositely conditioned by the signal TD fed to input 25 by virtue of the not counterpart signal $\overline{TD}$ generated by inverter 20a at the output 21 and fed to the input of circuit 22. Consequently, when the start signal ST is applied, depending on the particular level of the binary signal TD, only one of the AND/INV circuits 22, 23 is actuated.

More particularly, in each of the known modules 22, 23 there are provided three input diodes, e.g. diodes 26, 27, 28 of circuit 22. These three diodes provide the ANDing capability or function of the particular circuit 22, 23. Each of the circuits 22, 23 also includes a switching transistor, e.g. NPN transistor 29 of circuit 22, that provides the inverter capability or function of the particular circuit 22, 23. The diodes are poled such that the simultaneous presence of signals having the appropriate level and polarity are ANDed by the diodes and the resultant signal of the diodes is fed to the base of the switching transistor causing the latter to turn on and output current to flow in the collector circuit of the transistor. Under these circumstances, the collector terminal of the transistor is at the ground or zero level.

Should at least one of the input signals not have the appropriate level and polarity no output signal appears at the output of the AND portion of the particular circuit 22, 23 and consequently the module's transistor, e.g. transistor 29, remains turned off and no output current flows in the collector circuit of the transistor. Under these circumstances, the collector terminal of the transistor is at the voltage level V1. Depending on the number of inputs used, the AND portion of the particular circuit 22, 23 may be a two-input or three-input AND gate. In the embodiment of FIG. 2a, the AND portions of the respective circuits 22, 23 function as a two-input AND gate and consequently only two diodes are used, e.g. diodes 26 and 28 of circuit 22, and the other diode, e.g. diode 27, is not used in each module 22, 23. The unused diode may be connected to one of the other diodes of the triune as a redundant arrangement or alternatively may be connected to a voltage source of appropriate polarity and level so as to provide a permanent and positive, i.e. sure or direct, input conditioning signal to the particular diode input of the AND gate portion. However, since both of the aforementioned schemes require additional power, in the preferred embodiment the unused diode is left unconnected at its input terminal and in such a case may function as a back-up or spare diode if one of the other two used diodes of the triune should fail.

For the specific conductivity type, i.e. NPN, of the switching transistor of the module 22 or 23, and for the manner in which the input diodes are poled, the simultaneous presence of positive and appropriate level signals ST and TD or $\overline{TD}$, as the case may be, causes an output current to flow in the respective collector circuit of the associated switching transistor of circuit 22 or 23 as the case may be while no output current flows in the collector circuit of the switching transistor of the other module. In the preferred embodiment, the binary 0 level and the binary 1 level of a binary signal TD are a positive level and a ground level, respectively, and are associated with the binary 0 and binary 1 states, respectively, of the output conditioning signal TC of the particular driver stage. The signal ST goes from a normal ground level to a positive level when applied to the respective inputs of circuits 22, 23. When the signal TD is in its positive level, i.e. binary 0 state, it turns on the transistor of inverter circuit 20a causing the level of the not signal $\overline{TD}$ to go to a ground level and thereby disables the AND portion of the ONE AND/INV circuit 22. Conversely, when the signal TD is at a ground level, i.e. a binary 1 state, the inverter transistor is in the OFF condition and consequently the level of the not signal $\overline{TD}$ is at a positive level V1 and the ONE AND/INV circuit 22 is enabled. Likewise, the simultaneous presence of the positive signals ST, TD gate the ZERO AND/INV circuit 23 while the resultant not counterpart signal $\overline{TD}$ conditions the respective input of the ONE AND/INV 22 so that the latter remains in its normal no output current condition. For the simultaneous presence of the positive signal ST and a ground level signal TD, the resultant positive signal $\overline{TD}$ and signal ST gate the circuit 22 and the ground level signal TD conditions the circuit 23 so that the latter remains in its normal no output current condition. In the absence of either one or both of the signals ST and TD, the circuits 22 and 23 are in their normal no output current conditions. The collector voltage level of the respective transistors of the circuits 20a, 22, or 23 is substantially at a ground level when the particular transistor is conducting and a V1 level when not conducting.

The respective collector output circuits of the circuits 22 and 23 include the input windings 30a and 31a, respectively, of respective identical isolation transformers 30 and 31. The output windings 30b and 31b of the respective transformers 30, 31 are connected to the respective inputs of a transistorized amplifier switch means, e.g. NPN transistors 32, 33, which are two of four identical transistors packaged in a common known integrated circuit module indicated as two separate blocks 34 for sake of clarity, the other two transistors of which are not shown also for sake of clarity. The transistors 32, 33 are each configured as emitter followers and each is normally biased in a turned off condition in the absence of a current signal in the appropriate one of the output windings 30b, 31b to which it is coupled. The respective collectors of transistors 32, 33 are connected to a variable uni-polar power supply 35 via the respective steering diodes 36, 37. The respective outputs, i.e. emitters, of transistors 32, 33 are coupled via respective coupling capacitors 38, 39 to the respective inputs of the stages 40a, 40b, respectively, of the latch circuit generally indicated by the reference numeral 40.

The stages 40a, 40b of latch 40 in the preferred embodiment are identical known AND/INV integrated circuit modules. In the preferred embodiment, the AND gate portions of the circuits 40a, 40b are not utilized, the respective outputs of transistors 32, 33 being connected via the respective capacitors 38, 39 to the respective AND gate portion by-pass inputs 41a, 41b of modules 40a, 40b. Each of the particular known integrated circuit modules 40a, 40b have a steering diode, e.g. diode 42 of module 40a, which is connected to the input of a transistor, e.g. transistor 43 of module 40a. The steering diode, e.g. diode 42, is poled in such a manner that when the emitter follower, e.g. transistor 32, is turned on the emitter follower output signal conditions the particular latch stage transistor, e.g. transistor 43, to an ON condition. The collectors of the latch stage transistors, e.g. transistor 43, are commonly connected to the uni-polar power supply 35 via suitable respectively biasing resistors, e.g. resistor 44 of module 40a. The modules 40a, 40b include respective resistors, e.g. resistor 45 of module 40a, which together with respective capacitors 46, 46' are the respective RC coupling networks between the collector output of one stage, e.g. stage 40b, to the base input of the other stage, e.g. stage 40a. The output 47 of latch 40 is taken from the collector output of stage 40b.

In the output circuit of latch 40 is an inverter 48. In the preferred embodiment, inverter 48 is one of the twin inverter circuits of another known integrated circuit module that is an identical type to that of module 20. The output signal of latch 40 is fed via conductor 47 to the input 25' of inverter 48 and is inverted at the inverter's output 49. The input 25' is connected to the terminal, not shown, of module 48 that corresponds to the terminal 20a' of module 20 which is connected to the transistor base electrode via a biasing resistor which is an integrated circuit element of the module. Preferably, the capacitor 48a is shunted across the input terminal of module 48 corresponding to terminal 20a' of module 20 and the bias resistor by-pass terminal, not shown, of module 48 that corresponds to terminal 20a'' of module 20. Capacitor 48a thus provides a faster response time by the inverter 48 during the transient period associated with the changing from one quiescent level to the other of the output signal of latch 40.

The output 49 of inverter 48 is connected to the input of an output driver circuit of stage 12', the driver circuit being generally indicated by the reference numeral 50 in the drawing. In the preferred embodiment, it is preferable to connect the output of stage 40b through an inverter 48 to the input of the driver circuit 50 instead of connecting the output of stage 40a directly to the input of circuit 50. In this manner the latch 40 is isolated from the output driver circuit 50 and thus cannot be adversely affected by the base-emitter diode action of the input transistor 51 of circuit 50 as might result from a direct connection of the output of stage 40a to the input of circuit 50.

Output driver circuit 50 includes the aforementioned transistor 51 and a pair of output transistors 52, 53 which are arranged in a complementary symmetry connection and are operable in a push-pull manner. Transistors 51 and 52 are NPN types and transistor 53 is a PNP type in the preferred embodiment. The base of transistor 51 is connected to the output 49 of inverter 48 and is thus controlled by the output signal thereof. The common electrode, i.e. emitter, of transistor 51 is selectively connected by switch 54 either to a variable uni-polar power supply 55 or to ground, as shown by the illustrated position of switch 54 in FIG. 2a. The collector voltage for transistor 51 is obtained via resistor 56 from the voltage V4 of a uni-polar power supply, not shown, connected to the terminal 57. The output, i.e. collector, of transistor 51 is connected via the bias resistor 58 and respective bias resistors 59, 60 to the respective control inputs or base inputs of transistors 52 and 53. Adjustable upper and lower voltage clamping circuits indicated generally by the reference numerals 61 and 62, respectively, clamp the upper and lower voltage levels of the output signal of transistor 51 into substantially upper and lower reference levels V7 and V8, respectively. For this purpose, circuits 61 and 62 include the respective oppositely poled clamping diodes 63 and 64 and their respective bi-polar variable power supplies 65 and 66.

The transistors 52 and 53 are configured as emitter-followers and as aforementioned are operated in a push-pull manner. The collector of transistor 52 is connected to terminal 57 and its collector voltage is at the level V4. The collector of transistor 53 is connected by switch 54 either to the power supply 55 or to ground such as is shown in FIG. 2a for the illustrated position of switch 54. A noise rejection capacitor 67 is connected across the respective collectors of transistors 52, 53 and decouples the collectors of these transistors so as to mitigate and/or eliminate any adverse noise effects between them.

It should be noted that the return side of power supply 35 is selectively connected by switch 54 to the ground reference level or to the reference level V6. Hence, the power supply 35 is operable as a floating power supply. That is to say, regardless of which closed position the switch 54 is in, the drop across the respective collector-emitter circuits of the transistors of circuits 40a, 40b, 48 and base-emitter circuit of transistor 51, for a given voltage level V5, remain the same. Also, regardless of which closed position switch 54 is in, the power supply 35 for a given voltage level V5 provides the same drop across the respective collector-emitter circuits, which include the respective steering diodes 36, 37 and resistors 32', 33', of transistors 32, 33 which are provided in the aforementioned amplifier switch means that is in the input circuit of latch 40.

The output of stage 12' is taken from terminal 68 which is connected to the junction connection 69 of the respective emitters of transistors 52, 53. In the preferred embodiment, the terminal 68 in turn is connected via a suitable connector, preferably a coaxial connector cable, to an input, not shown, of a logic circuit, not shown, to be tested. The impedance of the connector is shown schematically for sake of clarity by a resistor symbol 70 in FIG. 2a. Near the particular input of the logic circuit under test there is provided a terminating resistor 71 for impedance matching purposes in a manner obvious to those skilled in the art. By virtue of the connection of the junction 69 to the impedance 70 and resistor 71, the transistors 52 and 53 are referenced directly to ground regardless of the position of the switch 54. With the switch 54 in the illustrated closed ground position the output signal TC is of a given unipolar type which in the preferred embodiment is a positive polarity. Under these conditions, the power supplies 65 and 66 are adjusted to provide positive voltage levels V7, V8 in the preferred embodiment. However, when the switch 54 is placed in its other closed position the output signal TC may either be of the opposite polarity type, i.e. negative in the preferred embodiment, or may be of a bi-polar type depending on the setting or adjustment of the upper level clamp circuit 61. For example, with the switch in the closed position that connects the power supply 55 into the circuit of stage 12', the clamping circuits 61 and 62 are adjusted to respective negative voltage levels V7, V8 so as to provide a negative output signal TC. However, under these latter conditions, if the clamping circuit 61 is set to an appropriate positive voltage level V7 and the clamping circuit 62 is set to a negative voltage level V8 the output signal TC is bi-polar. It should be understood that with the switch 54 in the closed position that connects the power supply 55 into the circuit of stage 12', it would also be possible to obtain positive uni-polar signals if the clamping circuit levels V7, V8 were set to appropriate positive levels. However, in the preferred embodiment, it is preferred to obtain the positive polarity signals TC with the switch 54 in the ground position as it requires less power.

The two steering diodes 36, 37 are included in a known integrated circuit module 72 which includes in addition six other diodes. The diodes are arranged in pairs, each pair having three individual output terminals. The respective cathodes of the diodes of a pair are connected to a common one of three terminals, and the respective anodes of the diodes of a pair are connected to mutually exclusive ones of the other two terminals. Two other diodes, i.e. diodes 73, 74 are shunted across the respective input windings 30a, 31a of the isolation transformers 30, 31 and are poled in such a manner so as to provide a short circuit path for the reverse current flowing in the particular input winding 30a when the particular transistor, e.g. transistor 29, with which the respective winding 30a or 30b is associated is turned off. Only one diode, e.g. diodes 36, 37, 73, 74 are used in each pair and the respective unused diodes provide a spare or back-up diode should the other diode of the respective associated pair fail. Also provided are various decoupling capacitors 75 in a manner well known to those skilled in the art.

In operation, assuming that the switch 54 is in the illustrated closed grounded position upon application of appropriate signals ST and TD to the inputs 24 and 25 there results a current through one of the windings 30a, 31a in a manner previously explained. For purposes of discussion, it will be assumed that the signal TD is in a binary 1 state, i.e. at its aforementioned ground level and as a result current flows in the winding 30a. The resultant induced voltage across the winding 30b turns on transistor 32 which in turn establishes a voltage drop across resistor 32' substantially equal to the voltage level V5. Since the other transistor 33 is not turned on the voltage across resistor 33' is essentially at the ground level for the grounded position of switch 54. Consequently, the voltage level at the junction of resistor 32' and capacitor 38 turns on transistor 43 of stage 40a or maintains the transistor 43 in the ON condition if it is conducting at the time. Under these conditions, the collector voltage of the conducting transistor 43 is essentially at the ground level and consequently conditions stage 40b's input via the aforementioned RC network of which condenser 46' is a part. The ground level input signal to stage 40b turns off the transistor of stage 40b or maintains it in the OFF condition, as the case may be, and consequently the output signal level, i.e. the collector voltage level of transistor of stage 40b, is substantially at the level V5. The output voltage signal level V5 of stage 40b, when fed back via the RC network 45, 46 to the input of the stage 40a, maintains the transistor 43 in its conductive state and thereby latches the latch 40. As a consequence, when the signal ST returns to its ground level the latch 40 remains in its latched condition. The output 47 of latch 40, which is substantially at the voltage level V5, turns on or maintains the transistor of inverter 48 in the ON condition and thereby places its respective collector voltage at a ground level, which is compatible to the binary 1 state or ground level of signal TD. The resultant ground collector voltage level of inverter 48 turns off the transistor 51 or maintains it in the OFF condition. The resultant collector voltage V3 of transistor 51 is at a voltage level substantially equal to the voltage level V4 less the IR drop across resistor 56.

With the transistor 51 not conducting, the input signal V3' to transistors 52, 53 is at the upper voltage level V7 which is preset to a positive level for the given transistor conductivity types, it being understood that the voltage V4 is a positive voltage level for these transistor conductivity types. As a result, transistor 52 is forward biased and the level of the output signal TC is set to the upper level V7, transistor 52 being configured as an emitter-follower as previously mentioned. During the quiescent condition of the signal TC the PNP transistor 53 is reverse biased and consequently no current flows in the transistor 53; that is, transistor 53 is turned off.

If during the next test cycle the input signal TD goes to its binary 0 level, i.e. a positive level, it can be readily demonstrated that the level of the output signal of inverter 48 at the output 49 goes to a voltage level V5 less an IR drop across the collector resistor, not shown, of inverter 48 which corresponds to the collector resistor 76 of circuit 20a. Hence the voltage level at the output of inverter 48 is compatible to the binary 0 state or positive level of signal TD. The positive output voltage level of inverter 48 turns on transistor 51 or maintains it in the ON condition. The resultant collector voltage V3 of transistor 51 is at substantially the ground voltage level. The lower level voltage clamp 62, which is preadjusted to a positive level V8, maintains the transistor 52 in a forward biased condition and consequently through the emitter-follower action thereof causes the output signal TC to be conditioned to its lower voltage level V8. During the quiescent condition associated with the voltage level V8 of signal TC the transistor 53 is reverse biased and hence is turned off.

Transistor 53 during the transition period associated with a change from an upper positive level V7 to the lower positive level V8 is momentarily forward biased and turned on and thus enhances the switching time of the signal TC associated with this transient as it discharges the capacitor reactive elements contained in the impedance 70. In switching from the lower voltage level V8 to the upper voltage level V7 transistor 53 remains reverse biased.

When the switch 54 is placed in its other position, the uni-polar power supply 55 is connected to the stage 12' as aforementioned. For the particular conductivity type transistors the power supply 55 provides a negative voltage V6. If a negative uni-polar output signal TC is desired, that is, one having negative upper and lower voltage levels V7, V8, respectively, the power supplies 65, 66 are preset accordingly to appropriate negative voltage levels. Similarly, if a bi-polar output signal is desired, the upper voltage clamp circuit 61 is adjusted to provide a positive voltage V7 and the lower voltage clamp is adjusted, i.e. set, to provide a negative voltage level. Under these conditions, the transistor 52 is back biased during the quiescent periods of the output signal TC and hence is not conducting. On the other hand, transistor 53 now becomes the active switching or emitter-follower element in a manner similar to the operation described with reference to transistor 52. Similarly, transistor 52 is momentarily turned on whenever the switching action of the signal TC causes it to be momentarily forward biased and thus enhances the switching time of the signal TC associated with the transient that provides the temporary forward biasing of transistor 52.

The aforedescribed driver circuit apparatus 12' thus provides output signals TC which have variable amplitude characteristics, that is, variable both in magnitude and polarity, in response to a standard input signal having fixed amplitude characteristics. The driver circuit is particularly useful for the system 10 of FIG. 1 and as is obvious to those skilled in the art may be used for other circuits or circuit applications such as, for example, the driving of magnetic memory systems, addressing systems, or the like. A description of a channel of the multi-channel apparatus 14 will now be described.

OUTPUT CHANNEL

Referring now to FIG. 2b, an output channel 14' of apparatus 14, FIG. 1, is connected to an output A of a circuit 11' of a given type to be tested, and which is preferably a logic circuit type. For purposes of explanation it is assumed that circuit 11' is a two input/single output logic circuit having a pair of inputs a and b coupled to the output of driver stage 12' of FIG. 2a and the output of another similar driver stage, not shown, respectively.

Sense amplifier stage 15' includes a pair of sense amplifiers 15a and 15b. In the preferred embodiment, the sense amplifiers 15a and 15b are high speed differential voltage comparators configured as respective known integrated circuit modules of identical types. Each of the sense amplifiers 15a, 15b has two inputs referred to in the art as inverting and non-inverting inputs, respectively. The inverting input of sense amplifier 15a is connected to a bi-polar power supply, not shown, which provides a voltage thereat having the upper aforementioned first reference level Va'. The non-inverting input of sense amplifier 15b is connected to a bi-polar power supply, not shown, which provides a voltage thereat having the lower aforementioned second reference level Vb'. The non-inverting input of amplifier 15a and the inverting input of amplifier 15b are commonly coupled to the output A of circuit 11'. The output of sense amplifier 15a is then aforementioned first sense output and the aforementioned output signal TB1 is provided thereat. Likewise, the output of sense amplifier 15b is the aforementioned second sense output and the aforementioned output signal TB2 is provided thereat.

It should be understood that signal TA may be either a positive or negative uni-polar signal or alternatively may be a bi-polar signal. Nevertheless, by judicious selection of the upper and lower reference levels Va' and Vb', the sense amplifier stage 12' can sense the actual level of the signal TA with respect to positive upper and positive lower reference levels, or negative upper and negative lower reference levels, or a positive upper level and a negative lower level depending on the particular upper and lower level amplitude characteristics of the signal TA for which signal TA is to be tested. As aforementioned, in the testing of logic circuits the levels Va' and Vb' are selected to be compatible to the binary upper and lower levels the signal TA is expected to obtain in response to the given input conditions if the circuit 11' being tested is operating correctly. As is obvious to those skilled in the art, if the signal TA to be sensed by the sense amplifier stage 15' is not compatible to the operating levels of the particular sense amplifiers 15a, 15b then appropriate signal amplifier means, not shown, and/or signal attenuation means, not shown, may be provided in the input of one or both of the appropriate sense amplifiers 15a, 15b to which the signal TA is or are fed.

Signals TB1, TB2 condition the two inputs 77, 78, respectively, of stage 16'. Stage 16' has a first pair of two input logic gates 16a, 16b which are gated by gate signal G1. Gate 16a is exclusively conditioned by the signal TB1, and gate 16b by the signal TB2. Stage 16' also has a second pair of three input logic gates 16c and 16d which are gated by gate signal G2. Gate 16c exclusively conditioned by the not counterpart signals $\overline{TB2}$, $\overline{TE}$ derived via respective inverters 16e, 16f from signals TB2 and TE. Gate 16d is exclusively conditioned by signal TE and the not counterpart signal $\overline{TB1}$ derived via inverter 16g from signal TB1. Signal TE is a binary signal, the binary levels of which represent the expected binary 0 and binary 1 states, respectively, of the signal TA for the respective appropriate input conditions if the circuit being tested is operating correctly in response to the given input conditions.

Gate signals G1 and G2 are applied to the gate control inputs 82 and 83, respectively, and signal TE is applied to the conditioning signal input 84 of stage 16'. Gate signals G1, G2 are applied during two predetermined first and second time periods, respectively, of each test cycle. Signal G1 is associated with the aforementioned amplitude and time response characteristics test. Signal G2 is associated with the aforementioned amplitude characteristic duration test. In the preferred mode of operation, the signals G1 and G2 are applied so that the first and second time periods overlap. It should be understood, however, that the signals G1 and G2 may be applied, if desired, so that there is a time interval between the first and second time periods of each test cycle.

In the preferred embodiment, circuits 16a, 16b, 16e–16g are known combination AND and INVERTER integrated circuits of identical types, the integrated circuit components of circuit 16g being shown schematically in greater detail for sake of clarity. Circuits 16c and 16d in the preferred embodiment are also known combination AND and INVERTER integrated circuits of identical types, the integrated circuit components of circuit 16c being shown schematically for similar reasons. It should be noted that circuits 16a–16g are basically identically configured and have NPN transistor types. Each of the circuits 16a–16g has a respective multi-emitter input transistor, e.g. three emitter transistor 79 of circuit 16c and two emitter transistor 80 of module 16g, which provide the ANDing function of the particular circuit. Should only one of the inputs of the multi-input transistor be connected to a signal source, the circuit acts or functions exclusively as an inverter. When more than one piont of the multi-input transistors are connected to different signal sources, the particular circuit provides the combined ANDing and inverting function.

The principles of operation of the known circuits 16a–16g are well known. For the given NPN transistor conductivity types, the bias voltage Vc is a positive voltage provided by a power supply, i.e. voltage source, not shown. For any particular AND/INV circuit 16a–16g, an UP input signal is required at all the emitter inputs of its multiple emitter input transistor, e.g. transistor 78 or 80, to provide a DOWN output signal at the particular circuit's output, e.g. output 81 of circuit 16c. On the other hand, a DOWN input signal applied to at least one of the multi-emitter inputs causes the output signal to be at an UP level. For the given NPN transistor conductivity types of circuits 16a–16g, a positive voltage level represents an UP level for both the input and output signals of the particular circuit, and substantially a ground voltage level represents a DOWN level for both the input and output signals of the particular circuit. If one of the multiple emitter inputs is not connected to a signal source, i.e. is left unconnected, it has no effect on the operation of the particular circuit with which it is associated. Thus, for example, in the case of each of the inverters 16e–16g, where in each of these circuits only one of the two emitter inputs are used and the other is not connected to an external signal source, cf. circuit 16g, for example, a positive signal, i.e. an UP signal, at the utilized input causes a ground level signal, i.e. a DOWN signal, at the output of the particular one of the circuits 16e–16g and vice versa.

The respective outputs of gates 16a and 16c are commonly connected to one input, i.e. set input, of latch circuit 17', and provide the aforementioned output signal T1 thereat. The respective outputs of gates 16b and 16d are commonly connected to the other input, i.e. the reset input, of latch circuit 17' and provide the aforementioned signals T2 thereat.

The latch circuit 17' includes a latch 17a–17b and also preferably an isolation inverter circuit 17c connected to the output of latch 17a–17b. In the preferred embodiment, the latch stage 17a and inverter 17c are known integrated circuits of the same type utilized for the gate 16a or inverter 16g of stage 16'. Latch stage 17b is also a known integrated circuit of the same type utilized for gate 16c of stage 16' so as to provide an external reset input for the latch 17a–17b. If desired latch 17a–17b may be reset by an external signal RESET provided by an appropriate manually operated signal source, not shown, and/or in the preferred embodiment by a control signal RESET provided by the general purpose computer of source 13, FIG. 1. Generally, in normal testing operations, the signal RESET is not utilized because of the correlation technique employed. The output of stage 17 provides the aforementioned test result signals TR which in the preferred embodiment are fed back to the general purpose computer for further analysis such as the aforementioned correlation and/or stored in the computer's memory for such future analysis including the aforementioned correlation and other diagnostic analysis or analyses.

The UP and DOWN signal levels of signals TB1, TB2 and TE and their not counterparts $\overline{TB1}$, $\overline{TB2}$, $\overline{TE}$ are provided with appropriate respective voltage levels which are compatible to the conditioning levels of the particular circuits 16a–16g with which these signals are associated. Thus, for the particular known integrated circuit types 16a–16g, the UP and DOWN levels of the respective signals TB1, TB2, TE, $\overline{TB1}$, $\overline{TB2}$, and $\overline{TE}$ are positive and substantially, i.e. near, ground levels, respectively. Likewise, the UP and DOWN signal levels of signals T1, T2 of stage 16' and the respective output signals of circuits 17a, 17b and 17c of latch 17', for the particular known integrated circuit types 17a–17c are positive and substantially, i.e. near, ground levels, respectively.

It should be understood that for the given NPN transistor conductivity types of circuits 16a–16g, 17a–17b, the respective UP and DOWN levels of the input and output signals associated with these circuits, which are the aforementioned positive and substantially, i.e. near, ground levels, respectively, represent binary 1 and 0 levels, respectively, in the preferred embodiment. The foregoing also applies to the input signal associated with circuit 17c which signal is also the output signal of circuit 17a. However, for the output signal TR of circuit 17c the UP and DOWN levels thereof represent binary 0 and 1 levels, respectively, and consequently the binary 0 and 1 levels of signal TR are at positive and substantially, i.e. near, ground levels, respectively.

Signal RESET is also a binary level signal, the UP and DOWN levels of which represent binary 1 and 0 states or levels, respectively. The UP and DOWN levels of signal RESET are also compatible to the conditioning signal level requirements of circuit 17b which for the known type circuit thereof are the aforementioned positive and ground levels, respectively. Thus, signal RESET, which is normally in a positive, i.e. UP level, when placed in a DOWN level resets output signal TR of latch 17 to a binary 0 level. In the preferred mode of operation where the reset capability of signal RESET is not utilized, signal RESET is maintained in its normal position or UP level and hence cannot reset latch 17'. Alternately, if system 10 is not provided with the optional reset feature the reset conditioning input to stage 17b may be left disconnected to signal source 13 and/or a two input AND/INV circuit of the type identical to stage 17a may be utilized for the stage 17b in lieu of the three input type illustrated in FIG. 2b.

Figure 3:
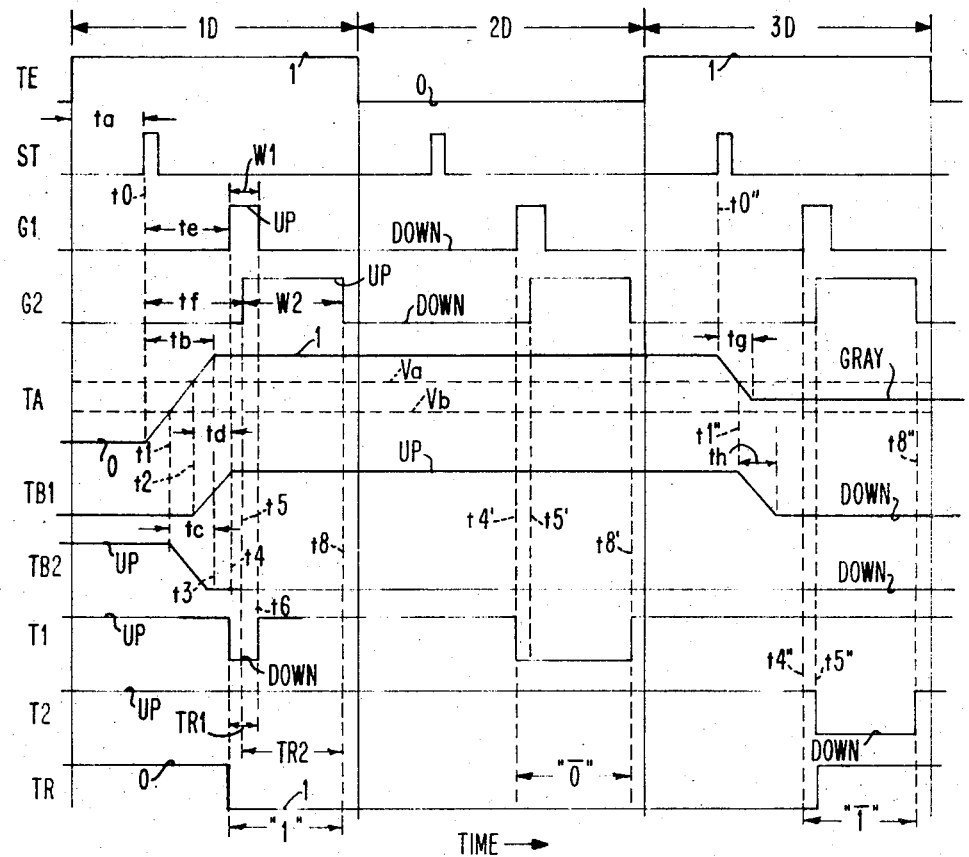

The operation of system 10 of FIG. 1 will now be described with reference to channel 14' of FIG. 2b and the waveforms of FIGS. 3, 4. It should be understood that the waveforms of FIGS. 3, 4 are illustrated in an idealized and exaggerated manner for sake of clarity and that the particular signals therein pertain to channel 14'. Also, for purposes of explanation, it will be assumed in the following description that the system 10 is testing identical logic circuits 11 and is under the control of the general purpose computer of signal source 13.

Initially, the amplitude levels of the respective sense amplifier pairs of each of the stages 15, e.g. sense amplifiers 15a and 15b of stage 15', FIG. 2b, are preset to be compatible to the respective upper and lower amplitude characteristics for which the output signals TA are to be tested. Also, the two programmable pulse generators 18a are preset via their impedance network 18 to provide respective preselected time delay characteristics te, tf, and pulse width characteristics W1, W2 for the gate signals G1 and G2. The respective characteristics te and W1 of signal G1 and the characteristics tf and W2 of signal G2 are associated with the aforementioned amplitude/time response characteristic test, sometimes referred to herein simply as the time response test, and the amplitude characteristic duration test, respectively. The delay characteristic te is judiciously selected to be compatible with the normal response time of the circuit under test, and delay through the sense amplifier and/or the respective inverter circuits of the logic stage, e.g. stage 16', being appropriately factored into the delay period te. The pulse width W1 of signal G1 is preferably selected to be of a sufficient duration to allow only a brief sampling of the output level of the signal TA. The pulse width W2 of signal G2 is preferably selected to be of a sufficient and somewhat longer duration to allow the monitoring of the actual level of the signal TA for a given substantial portion of the duty period of the output signal TA commencing at some predetermined time thereof by the judicious selection of the time delay tf. Thus, the aforementioned first and second time periods of each test cycle associated with the time response test and the duration test, respectively, are thus associated with the signal pulses G1 and G2, respectively. As aforementioned, in the preferred operational mode the first and second time periods overlap and which is accomplished by the judicious selection of the aforementioned respective characteristics te, tf, W1, W2 of pulse signals G1, G2. Also, the respective upper and lower voltage clamping circuits of each of the driver stages 12 e.g. circuits 61 and 62 of stage 12', FIG. 2a, are preset to appropriate levels and the respective switches, e.g. switch 54, FIG. 2a, are in a preselected one of the two closed positions. For purposes of explanation, it will be assumed that the logic circuits 11 under test are conditioned by positive uni-polar signals TC, in which case the respective switches, e.g. switch 54, have been positioned to their grounded contact and the voltage levels V7 and V8 are at appropriate upper and lower positive levels, for the reasons previously explained. The adjustment of the voltage levels V$a'$, V$b'$, and/or the voltage levels V7 and V8 may be done manually and/or by automatic means, not shown. If these adjustments are made by automatic means, they may also be programmable automatic means operable under appropriate control signals provided by the general purpose computer of signal source 13 of the preferred embodiment. Signal RESET in the system 10 of FIG. 1 is also preset to its normal level, i.e. its UP or positive level, and remains at that level in the preferred mode of operation throughout the entire testing operation, for the reasons previously explained.

Referring now to FIG. 3, at the commencement of each test cycle, e.g. cycles 1D, 2D, etc., signal source 13 provides the conditioning signals TD not shown in FIG. 3, to the driver stages 12 and the appropriate conditioning signals TE to the stages 16 cf. FIG. 3 and signal TE thereof which conditions logic gate 16d and logic gate 16c via inverter 16f of stage 16', FIG. 2b. After a short time interval ta in each test cycle the synchronization signal ST is provided by the computer of signal source 13. For purposes of explanation, it is assumed that the test program associated with the computer of signal source 13 is testing for alternate binary 1 and binary 0 levels in successive test cycles as indicated by the respective expected UP and DOWN binary levels of the binary signal TE, FIG. 3. In response to the conditioning signals TD applied to the driver stages 12, the inputs a–m of the circuits 11 are conditioned by the signals TC of stage 12 when the latter are gated by the signal ST. As a result, respective output signals TA appear at the outputs A–N of the circuits 11 under test.

In the absence of gate signals G1, G2, the signals T1, T2 of stage 16' are both at the same quiescent binary levels. For the known integrated circuit types of circuits 16a–16d, signals T1 and T2 are in respective UP or 1 levels, i.e. positive levels, since the respective gate control inputs 81 and 82 are at ground or 0 levels. Under such circumstances, latch 17' is in a previous one of its two bi-stable states. Thus, as shown in FIG. 3, during the period ta of the first test cycle 1D signals T1 and T2 are at their respective UP levels. It is assumed also that during the period ta, signal TA is in a previous binary 0 state as shown in FIG. 3. For this assumed binary level of signal TA, signals TB1 and TB2 are in their respective DOWN and UP levels, for the reasons previously explained. It is also assumed that during the period ta the latch 17' is in a previous binary 0 state.

At time t0, the signal ST is applied and the signal TA in response to the gated conditioning signals TC switches from its binary 0 level to its binary 1 level during the period tb.

At time t1, the signal TA is at the lower voltage level V$b$ and the signal TB2 in response thereto commences to switch from its UP level to its DOWN level during the period tc.

At time t2, the signal TA is at the upper voltage level V$a$ and the signal TB1 commences to switch from its DOWN to its UP level during the period td. Signals T1 and T2 remain in their respective UP levels due to the aforementioned absence of the gate signals G1 and/or G2. As a result, during the period te the latch 17' remains in its previous binary 0 state.

At time t3, it is assumed that the signal TA is now at the binary 1 level so that by the time t4 the signal TB1 has reached its binary UP level as shown in FIG. 3.

At time 4, the gate signal G1, after a suitable time delay te, is placed in its binary UP level. As a result, the respecive UP levels of the signal TB1 and G1 at the respective inputs of gate 16a cause the level of the signal T1 to be placed in its DOWN condition or state. Since signal TB2 is in a DOWN level at time t4, the output signal T2 of gate 16b remains in its UP level.

The DOWN level of signal T1 sets the output of latch stage 17a to a binary 1 or UP level at time t4 which, when inverted by the inverter 17c, causes the signal TR to be placed in its binary 1 or DOWN level. The respective UP levels of the output signal of stage 17a and signals T2 and RESET causes the output signal of stage 17b to be in a binary 0 or DOWN level and thereby latches the output of stage 17a to the UP level and consequently signal TR to the binary 1 level.

At time t5, which in the preferred operational mode occurs during the pulse width period W1 of the relatively narrow gate width signal G1, the gate signal G2 is applied after an appropriate time delay tf. As is well known to those skilled in the art, if latch 17' is in a binary 1 level in order to reset the latch 17' to a binary 0 level, one of the inputs of the latch stage 17b must be placed in a binary 0 or DOWN level. With the latch 17' in the binary 1 state, a binary 0 or DOWN level input signal applied to either of the inputs of stage 17a has no effect on the output level of the signal TR, that is to say, the signal TR remains at the binary 1 level. Similarly, of the signal TR of the latch 17' is in a binary 0 state, a binary 0 level signal must be applied to either of the inputs of the stage 17a in order to set the latch and more particularly the signal TR to a binary 1 state. If the latch 17' is in a binary 0 state, a binary 0 or DOWN level input signal to any of the inputs of the stage 17b has no effect and the signal TR remains in its binary 0 state. Thus, during the first test cycle 1D in order to reset the signal TR to its binary 0 state after it has been placed in a binary 1 state by the signal T1, the level of signal T2 must go to a binary 0 state. However, since at time t5 signal TB2 is in its DOWN state and signal $\overline{BT1}$ is in its DOWN state either of the output signals of the gates 16b, 16d are capable of providing a binary 0 or DOWN level for the signal T2. Consequently, the latch remains latched to the previous binary 1 state even after the signal T1 at time t6 returns to its UP level in response to signal G2 returning to its DOWN level and at time t8 when the signal G2 returns to its DOWN level.

During the second test cycle 2D the signal TE is in its DOWN level and the circuit 11' being tested is conditioned by input signals TC in response to new data signals TD provided at the beginning of the second test cycle TD. The conditioning signals TC applied to the inputs of the circuit 11' under test during test cycle 2D are at levels that would normally cause the output of the circuit 11' to be in a binary 0 state. However, for purposes of illustration, it is assumed that the signal TA remains in its previous binary 1 level or state so that at time t4' when gate signal G1 is applied the respective levels of signals TA and G1 place the signal T1 in its DOWN level. Signal T2, however, remains in its UP level due to the DOWN level of signal TB2. Since latch 17' is already in its binary 1 level, the DOWN level of signal T1 has no effect on the binary 1 level of the signal TR. The same occurs when the signal G2 is applied at time t5' and the respective positive levels of signal G2, $\overline{TB2}$, and $\overline{TE}$ which are applied to the gate 16c and cause the signal T1 to remain in its DOWN level until time t8'.

At the commencement of the third test cycle 3D the signal TE is in the binary 1 level and it is assumed that the conditioning signals TC to the circuit 11' would normally place the output signal TA in a corresponding binary 1 level. For purposes of explanation, it is assumed, however, that at the time t0'' when the synchronization signal ST is applied and the signal TA begins to respond to the conditioning signals TC it only goes during the period tg to a level which is between levels V$a$ and V$b$ and designated by the legend GRAY. As a result, at time t1'' the signal TA is at the level V$a$ and the signal TB1 commences to go from its UP to its DOWN level during the period *th*. However, since the signal TA never goes below the level V*b*, the signal TB2 remains in its DOWN level or state. Consequently, at time *t*4″ when the gate signal G1 is applied, both signals TB1 and TB2 are in their respective DOWN levels and consequently signals T1 and T2 remain at their respective UP levels and the output signal TR of latch 17′ remains in its previous binary 1 level. However, at time *t*5″ when signal G2 is applied the respective positive levels of signals G2, TE, TB1, which are applied to the gate 16*d* cause signal T2 to be placed in its DOWN level and thus resets the latch 17′ to the 0 level. At time *t*8″ when signal G2 returns to its DOWN level, the signal TR of latch 17′ remains in its binary 0 state for the reasons previously explained.

If the actual level of the signal TA is in the expected binary level for the given set of input conditions, the output signal TR is in the corresponding binary state. However, if the actual level of the signal TA is not in the expected binary level then the level of the output signal TR is in a binary state opposite to the expected binary state. Thus, for example, as shown in test cycle 1D the actual level of the signal TA is in the binary 1 state and the expected level is also a binary 1 state. Consequently, the binary 1 level of the signal TR, when correlated, represents that the signal TA is in the correct, i.e. expected binary state "1." However, as shown for example by the second test cycle 2D the actual level of the signal TA is in a binary 1 state and the expected binary level is a 0 state. As a result, the binary state of the signal TR is in an opposite binary state, i.e. a binary 1 state, to that of the expected state, i.e. a binary 0 state, in which case the opposite binary 1 state of the signal TR represents, when subsequently correlated, that the signal TA is not in the correct, i.e. expected state, and indicated in the drawing by the not counterpart reference character "0." Similarly, in test cycle 3D the binary 0 level of the signal TR represents, when subsequently correlated, that the signal TA is not in the expected binary 1 state as indicated by the not counterpart reference character "1."

If the actual signal level of the signal TA is in a binary 0 state and the expected binary state is also a binary 0 state, then the signal TR will be in its binary 0 state. However, if the actual level of the signal TA is in a binary 0 state and the expected binary level is a 1 state, then the signal TR is in its binary 0 level which represents, when subsequently correlated, that the actual signal level of the signal TA is a not level "1." Similarly, if the actual level of the signal TA is a GRAY level and the expected binary level is at a 1 level, then the resultant signal TR is in a binary 0 level which represents, when subsequently correlated, that the actual signal level of the signal TA is a not state "1." Likewise, if the signal TA is in a GRAY area and the expected state is a binary 0 state, then the resultant signal TR is in a binary 1 state which represents, when subsequently correlated, that the signal is in a not state "0."

In the preferred mode of operation, the signal TR attained during the period TR2 is first correlated to determine if the actual level of the signal TA is in and remains in the expected binary state. If the correlation is in the affirmative, the actual level of the signal TR attained during the period TR1 is correlated with the expected binary state from which it is ascertained whether or not the signal passes the time duration test. If the correlation of the signal TR attained during the period TR2 indicates that the actual level of the signal TA did not attain or did not remain in the actual binary state, the output signal TA is considered a failure and the test results of the time duration test are disregarded. As aforementioned, the correlation of the preferred embodiment is accomplished by the test program for which the general purpose computer of source 13 is programmed. Alternatively, additional logic circuitry may be provided for making the respective determinations and correlations.

It should be understood that sometimes the signal TA may switch from one binary state to another during the period G1. In some of the cases, the signal TA may be considered to be good if it reaches the expected binary level and remains there within a certain time and, of course, remains there during the subsequent period W2. For example as shown in FIG. 4, signals TA, e.g. solid line signal TA, which commence switching to the expected binary level prior to the time indicated by the vertical line with the legend FAIL TIME LINE are considered to have passed the time response test providing the signal TA subsequently remains at the expected binary level. However, signals TA, e.g. dash line signal TA of FIG. 4, which commence switching to the expected binary state after the FAIL TIME LINE are considered to be failures even if they should subsequently reach the expected binary level and remain at that level.

Typical known manufacturers' types of the circuits utilized in the system 10, as well as typical values of the discrete circuit components utilized therein are indicated in the following Table I under appropriate headings, as follows:

TABLE I

Driver stage:
    Integrated circuit module 20—Type 841579
    Integrated circuit modules 22, 23—Type 841573, each
    Integrated circuit module 34—Type 841557
    Integrated circuit modules 40*a*, 40*b*—Type 841551, each
    Integrated circuit module 72—Type 841559
    Transistors 51, 52—Type 2N2369, each
    Transistors 53—Type 102
    Diodes 63, 64—Type FD700, each
    Resistors 32′, 33′—200 ohms, each
    Resistor 56—75 ohms
    Resistor 58—150 ohms
    Resistors 59, 60—15 ohms, each
    Capacitors 38, 39—45 pf., each
    Capacitors 46, 46′, 48*a*—25 pf., each
    Capacitor 67—10 $\mu$f.
    Capacitor 75—0.68 $\mu$f., each
Channel 14′:
    Integrated circuits 15*a*, 15*b*—Type uA710, each
    Integrated circuits 16*a*, 16*b*, 16*e*–16*g*, 17*a*, 17*c*— Type SN5400
    Integrated circuits 16C, 16*d*, 17*b*—Type SN5410
    Programmable generators 18*a*—Type R116, each It should be understood that the aforementioned type SN5400 integrated circuit module has quadruple, 2-input gate circuits per module, and the aforementioned type SN5410 has triple 3-input gate circuits per module.

It should be understood while the invention has been described with respect to a preferred mode of operation and/or as employing transistors of a given conductivity type and/or being fabricated with certain integrated circuits that the invention may be modified to provide other modes of operation and/or to provide transistors of opposite and/or complementary conductivity types and/or may be implemented by vacuum tubes and/or discrete component circuits in a manner well known to those skilled in the art.

Thus, while the invention has been particularly shown and described with reference to the preferred embodiments, it will be understood by those skilled in the art that the foregoing and other changes in form and detail may be made therein without departing from the spirit and scope of the invention.

I claim:

1. Test circuit apparatus for testing at least one output signal of at least one given circuit for predetermined amplitude and response time characteristics in response to at least one predetermined set of input conditions to said given circuit, said apparatus comprising:
    bi-level sense amplifier means for sensing said signal and having first and second outputs, said sense amplifier means providing at said first and second outputs first and second binary sense output signals, respectively, said first sense output signal being in a predetermined one of its two binary levels whenever said signal of said given circuit is above a predetermined first reference level and in the other of its two binary levels whenever said signal of said given circuit is not above said predetermined first reference level, said second sense output signal being in a predetermined one of its two binary levels whenever said signal of said given circuit is below a predetermined second reference level and in its other binary level whenever said signal of said given circuit is not below said predetermined second reference level, said predetermined ones of the respective binary levels of said first and second signals being complementary with respect to each other whenever said output signal of said given circuit has a level that is either above or below said first and second predetermined reference levels, respectively, and said first and second binary sense output signals being in the same preselected ones of their respective binary levels whenever said output signal of said given circuit is in a level which is substantially inclusive between said first and second reference levels; and logic circuit means having first and second inputs conditioned by said first and second binary sense output signals, respectively, and a third input conditioned by a binary third signal, the first and second binary levels of said third signal being indicative of the expected amplitude characteristic of said output signal for said predetermined set of input conditions with respect to said first and second reference levels, respectively, said logic circuit means further having first and second gate control inputs and an output, said logic circuit means providing a binary first test result signal at its output during a first time period in response exclusively to said first and second binary sense output signals and a first control signal applied to its first and second inputs and said first control input, respectively, the first and second binary levels of said first test result signal being indicative of the actual level of the output signal of said given circuit whenever said actual level is above and below said first and second reference levels, respectively, said first test result signal remaining in its previous output level whenever the actual level of the output signal of said given circuit is inclusively between said first and second reference levels, said predetermined first time period being related to the aforesaid predetermined response time characteristic, said logic circuit means further providing a binary second test result signal at its said output during a second time period in response exclusively to said first and second binary sense output signals, said third signal, and said second control signal applied to its first, second, and third inputs and said second control input, respectively, said second test result signal being in a binary level corresponding to the expected amplitude characteristic whenever said output signal of said given circuit has and maintains the aforesaid expected amplitude characteristic during said second period and said second test result signal being in a binary level corresponding to the opposite expected amplitude characteristic whenever said output signal of said given circuit does not have or maintain the aforesaid expected amplitude characteristic during said second period, said second period being substantially coincident with a predetermined part of the duty period of the output signal of said given circuit.

2. Test circuit apparatus according to claim 1 further comprising:

means for correlating said first and second test result signals, said correlating means determining at least that the output signal of said given circuit has and maintains the aforementioned expected amplitude characteristic during said second period and that the output signals of said given circuit responds to said predetermined set of input conditions in the response time associated with the aforementioned predetermined response time characteristic whenever said output signal has both said characteristics.

3. Test circuit apparatus according to claim 1 further comprising:

means for correlating said first and second test result signals, said correlating means determining that the output signal of the given circuit does or does not have or maintain the aforementioned expected amplitude characteristic whenever said output signal does or does not have or maintain, respectively, said amplitude characteristic during said second time period, and further determines that the output signal of the given circuit does or does not respond to said set of input conditions in the response time associated with said predetermined response time characteristic whenever said output signal does have and maintains said amplitude characteristic during said second time period and does or does not respond, respectively, to said set of input conditions in said response time.

4. Test circuit apparatus according to claim 1 wherein said given circuit is a logic circuit, and said amplitude characteristics are related to the expected binary 1 and binary 0 levels of the output signal of said logic circuit.

5. Circuit apparatus according to claim 1 wherein said bi-level sense amplifier means comprises:

first and second sense amplifiers of the differential comparator type, said first and second sense amplifier including said first and second outputs, respectively, and having respective first and second inputs, the first input of said sense amplifier being referenced by said first reference level and said second input of said second sense amplifier being referenced by said second reference level, said first and second inputs of said second and first amplifiers, respectively, commonly sensing said output signal of said given circuit.

6. Test circuit apparatus according to claim 1 wherein said logic circuit means further comprises:

first, second, third and fourth gate circuits, said first gate circuit conditioned by said first binary sense output signal and actuated by said first control signal, said second gate circuit being conditioned by said second binary sense output signal and actuated by said first control signal, said third gate circuit being conditioned by the respective not counterparts of said second sense output signal and of said third signal and actuated by said second control signal, and said fourth gate circuit being conditioned by the not counterpart of said first sense output signal and by said third signal and actuated by said second control signal;

said first and third gate circuits having respective outputs commonly coupled together;

said second and fourth gate having respective outputs commonly coupled together;

latch circuit having set and reset inputs, respectively, said commonly coupled outputs of said first and second gate circuits being coupled to said set input, and said commonly coupled output of said second and fourth gate circuits being coupled to said reset input, said latch circuit including said output of said logic circuit for providing said test result signals thereat; and respective inverter means for providing the not counterparts of said first and second sense output signals and said third signal.

7. Test circuit apparatus according to claim 6 wherein said output of said logic circuit further comprises an inverter circuit.

8. Test circuit apparatus according to claim 1 further comprising driver circuit means for providing binary conditioning output signals having variable selectable amplitude characteristics for said circuit being tested in response to binary conditioning input signals to said driver circuit means, said binary conditioning input signals having predetermined fixed signal amplitude characteristics.

9. Test circuit apparatus according to claim 8 wherein said driver circuit apparatus comprises:

second logic circuit means having a conditioning signal first input, a gate control signal second input, and first and second outputs, said logic circuit means providing a logic circuit output first signal at said first output thereof whenever one of said binary conditioning input second signals is in its binary 1 state and applied to said first input thereof and a predetermined third gate control signal is applied to said second input thereof, said logic circuit means providing a logic circuit output second signal at said second output thereof whenever one of said binary conditioning input second signals is in its binary 0 state and applied to said first input thereof and the aforesaid gate control third signal is applied to said second input thereof;

latch circuit means having first and second input coupling means coupled to said first and second outputs, respectively, of said second logic circuit means and predetermined output circuit means associated therewith, said latch circuit means providing at said output circuit means a latch circuit binary output signal having predetermined first and second binary levels, said latch circuit binary output signal being in its first and second binary levels in response to said logic circuit first and second signals, respectively, and output driver circuit means comprising:
predetermined selective switching means,
a first transistor of a given conductivity type,
a pair of second and third transistors in a predetermined complementary symmetry arrangement, each of said transistors having an input, output and common electrode, respectively, the input electrode of said first transistor being coupled to said output circuit means and the output electrode thereof being coupled to the respective control electrodes of said second and third transistors and the common electrode of said first transistor being connected to said switching means for selectively referencing said first transistor and said circuit means to a ground reference level or to a predetermined first uni-polar voltage source, said second and third transistors having their respective common electrodes connected to the output of said driver circuit apparatus, said first and second transistors being of the same conductivity type and having their respective output electrodes biased by a predetermined uni-polar second voltage supply, the output electrode of said third transistor being coupled to said selective switching means, said other terminal of said second uni-polar power supply biasing said latch circuit means, and first and second upper and lower bi-level adjustable clamping circuits for adjusting the upper and lower levels, respectively, of said first output signal at said driver circuit output, said driver circuit apparatus providing predetermined uni-polar output signals at said output whenever said switching means is in the ground reference level position, and said driver circuit apparatus providing said first output signal with at least one opposite polarity level whenever said switching means is in said uni-polar reference level position;

said first and second coupling means further comprising:
first and second isolation transformers, respectively, for isolating said latch circuit means and driver circuit means from said second logic circuit means.

10. Driver circuit apparatus for providing at output terminal means thereof a binary output first signal having variable selectable predetermined signal amplitude characteristics in response to a binary input second signal having predetermined fixed signal amplitude characteristics, said driver circuit apparatus comprising:

logic circuit means having a conditioning signal first input, a gate control signal second input, and first and second outputs, said logic circuit means providing an output second signal at said first output whenever said binary input second signal is in its binary 1 state and applied to said first input and a predetermined gate control signal is applied to said second input, said logic circuit means providing an output third signal at said second output whenever said binary input second signal is in its binary 0 state and applied to said first input and the aforesaid gate control signal is applied to said second input;

latch circuit means having first and second input coupling means coupled to said first and second outputs, respectively, and predetermined output circuit means associated therewith, said latch circuit means providing at said output circuit means a binary output fourth signal having predetermined first and second binary levels, said fourth signal being in its first and second binary levels in response to said second and third signals, respectively; and output driver circuit means comprising:
predetermined selective switching means,
a first transistor of a given conductivity type,
a pair of second and third transistors in a predetermined complementary symmetry arrangement, each of said transistors having an input, output and common electrode, respectively, the input electrode of said first transistor being coupled to said output circuit means and the output electrode thereof being coupled to the respective control electrodes of said second and third transistors and the common electrode of said first transistor being connected to said switching means for selectively referencing said first transistor and said circuit means to a ground reference level or to a predetermined first uni-polar voltage source, said second and third transistors having their respective common electrodes connected to said output terminal means of said driver circuit apparatus, said first and second transistors being of the same conductivity type and having their respective output electrodes biased by a predetermined uni-polar second voltage supply, the output electrode of said third transistor being coupled to said selective switching means, said other terminal of said second uni-polar power supply biasing said latch circuit means, and first and second upper and lower bi-level adjustable clamping circuits for adjusting the upper and lower levels, respectively, of said first output signal at said driver circuit terminal means, said driver circuit apparatus providing predetermined uni-polar output signals at said terminal means whenever said switching means is in the ground reference level position, and said driver circuit apparatus providing at least said first output signal with at least one opposite polarity level whenever said switching means is in said uni-polar reference level position;

said first and second coupling means further comprising:
first and second isolation transformers, respectively, for isolating said latch circuit means and driver circuit means from said logic circuit means.

11. Driver circuit apparatus according to claim 10 wherein said predetermined output circuit means of said latch circuit means further comprises an inverter circuit.

12. A test system for testing the binary amplitude and response time characteristics of logic circuit means, said logic circuit means having at least one input and at least one output, said test system comprising in combination:
a plurality of driver circuit stages having respective first outputs for providing conditioning binary first signals having adjustable variable signal characteristics thereat, predetermined ones of said inputs of said logic circuit means being coupled to predetermined ones of said first outputs, each of said driver stages further having a conditioning signal first input and a gate control second input;
a plurality of output circuit channels having respective third inputs coupled to mutually exclusive predetermined ones of said outputs of said logic circuit means, each of said output circuit channels further having a signal fourth input, gate control fifth and sixth inputs, and a second output; and
signal generator means having a plurality of third outputs, and fourth, fifth, sixth and seventh outputs, respectively, said third outputs being coupled to predetermined ones of said first inputs of each of said channels, said fourth output being coupled to said fourth input of each of said channels and said fifth and sixth outputs being coupled to said fifth and sixth inputs, respectively, of each of said channels, said signal generator means providing conditioning binary input second signals having fixed signal characteristics at said third outputs and a conditioning binary input third signal at said fourth output, and further providing gate control fourth, fifth and sixth signals in a predetermined synchronized relationship at said fifth, sixth and seventh outputs, respectively; each of said driver stages in response to a predetermined one of the binary levels of a second signal applied to the particular first input thereof providing a predetermined one of the binary levels of said first signal at the particular first output thereof when said fourth gate control signal is applied to the second input thereof; each of said driver stages in response to the other binary level of a second signal applied to the particular first input thereof providing the other binary level of said first signal at the particular first output thereof when said fourth gate signal is applied to the second input thereof;
said conditioning binary input third signal having a first binary level for at least one set of input first signals and a second binary level for at least another set of input first signals;
each of said channels providing at the particular second output thereof two binary test output seventh and eighth signals, respectively, indicative of the time response characteristic and amplitude characteristic, respectively, of the output signal at the particular output of the logic circuit means which is coupled to the third input of the particular channel, said test seventh signal being provided by the particular channel during application of said fifth signal to said channel's sixth input in response to the actual signal level of the particular output signal of the logic circuit means present at said channel's third input, and said eighth signal being provided by the particular channel during application of said sixth signal to said channel's seventh input in response to the actual signal level of the particular output signal of the logic circuit means present at said channel's third input and the third signal present at the fourth input, at least said test output eighth signal being in a predetermined binary level corresponding to the binary level of the third signal if the actual level of the output signal of the logic circuit means is in the correct binary level associated with the particular set of input first signals and being in a binary level opposite to the binary level of the third signal if the actual level of the output signal of the logic circuit means is in an erroneous level for the particular set of input first signals.

13. A test system according to claim 12 further comprising:
means for correlating said seventh and eighth test signals, said correlating means determining for each output signal of said logic circuit means at least that the particular output signal has and maintains the correct amplitude characteristic during the application of said sixth signal and that the particular output signal responds to the particular set of input first signals in the response time associated with the aforementioned predetermined response time characteristic whenever said particular output signal has both said characteristics.

14. A test system according to claim 12 further comprising:
means for correlating said seventh and eighth test signals, said correlating means determining for each output signal of said logic circuit means that the particular output signal does or does not have or maintain the aforementioned correct amplitude characteristic whenever the particular output signal does or does not have or maintain, respectively, said amplitude characteristic during the application of said sixth signal, and further determines that the particlar output signal does or does not respond to the particular set of input first signals in the response time associated with said predetermined response time characteristic whenever the particular output signal does have and maintains said amplitude characteristic during the application of the sixth signal and does or does not respond, respectively, to the particular set of input first signals in the response time associated with the response time characteristics.

15. A test system according to claim 13 wherein said correlation means further comprises a computer, said computer being also comprised as an element of said signal generator means for providing at least said second, third, and fourth signals.

16. A test system according to claim 14 wherein said correlation means further comprises a computer, said computer being also comprised as an element of said signal generator means for providing at least said second, third and fourth signals.

References Cited
UNITED STATES PATENTS 3,286,175   11/1966   Gerbier _____ 324—73

RUDOLPH V. ROLINEC, Primary Examiner

E. L. STOLARUN, Assistant Examiner

U.S. Cl. X.R.

324—158